Oct. 14, 1924.
E. R. CREAMER
MACHINE FOR MAKING MOLDING FOR UPHOLSTERING
Filed Dec. 31, 1923   3 Sheets-Sheet 3
1,511,507
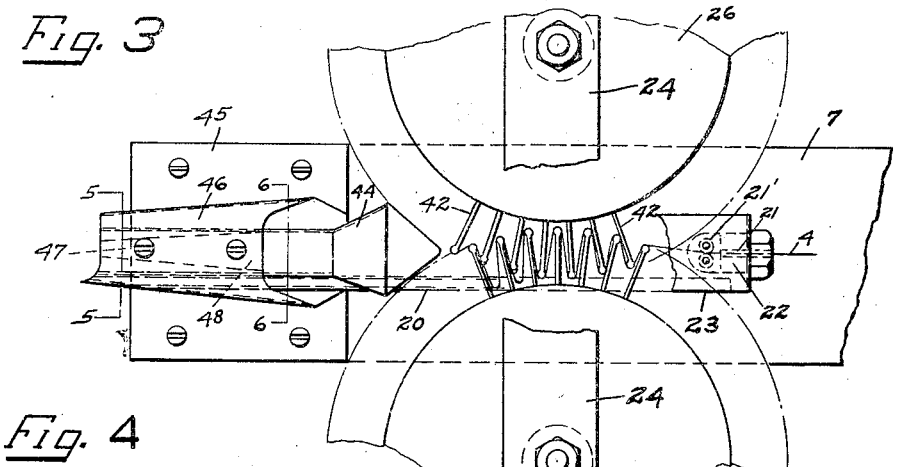
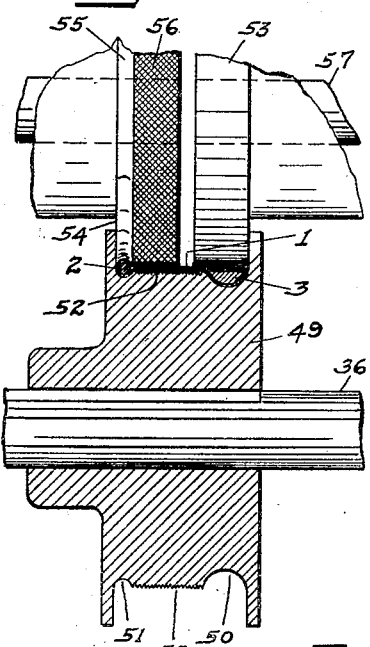
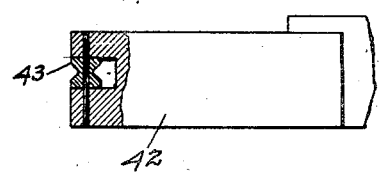
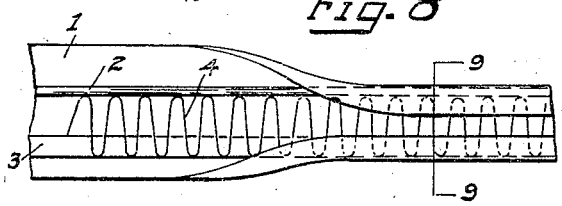
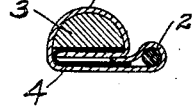
Inventor
Edgar R. Creamer
By
Attorneys Patented Oct. 14, 1924.

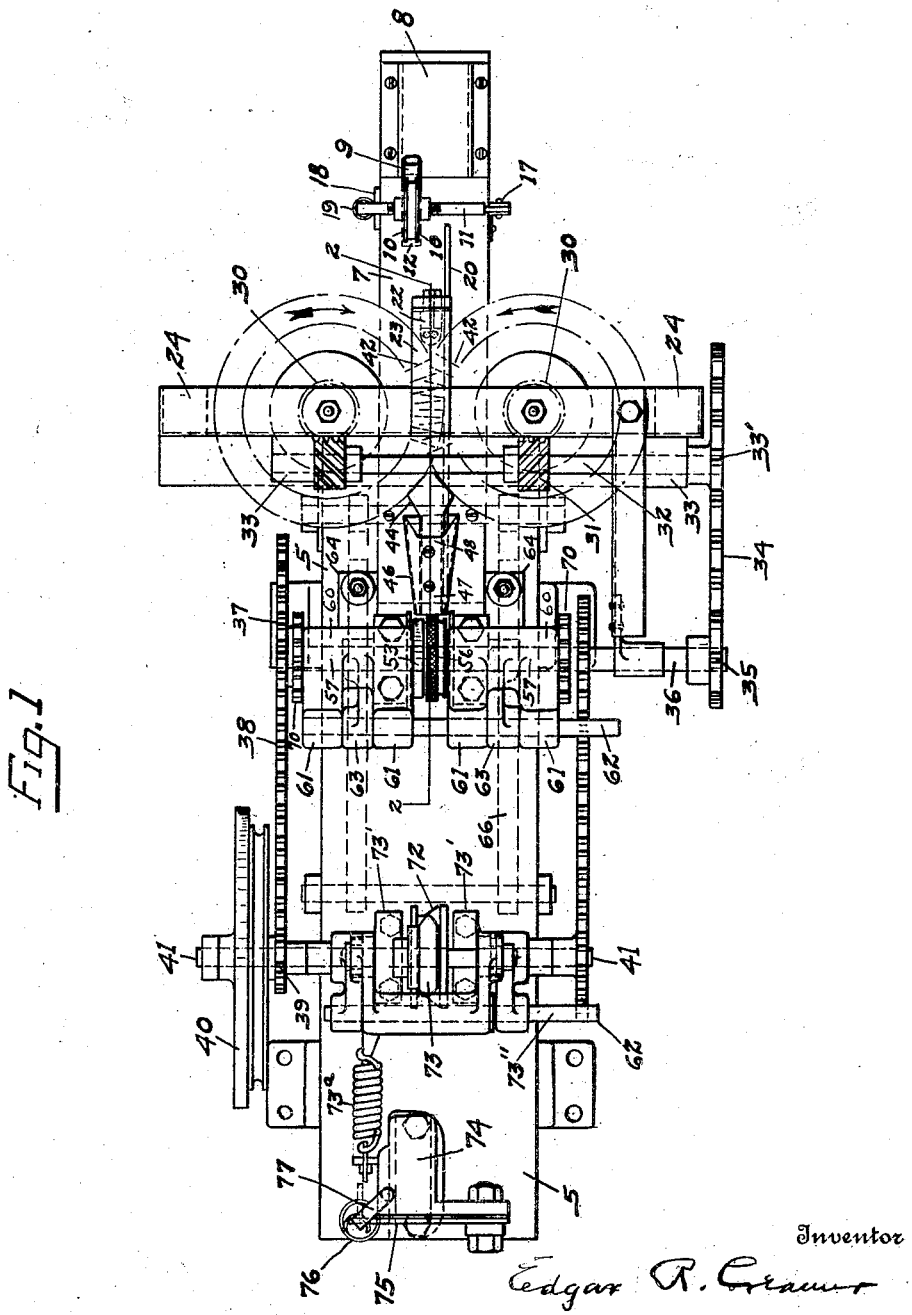

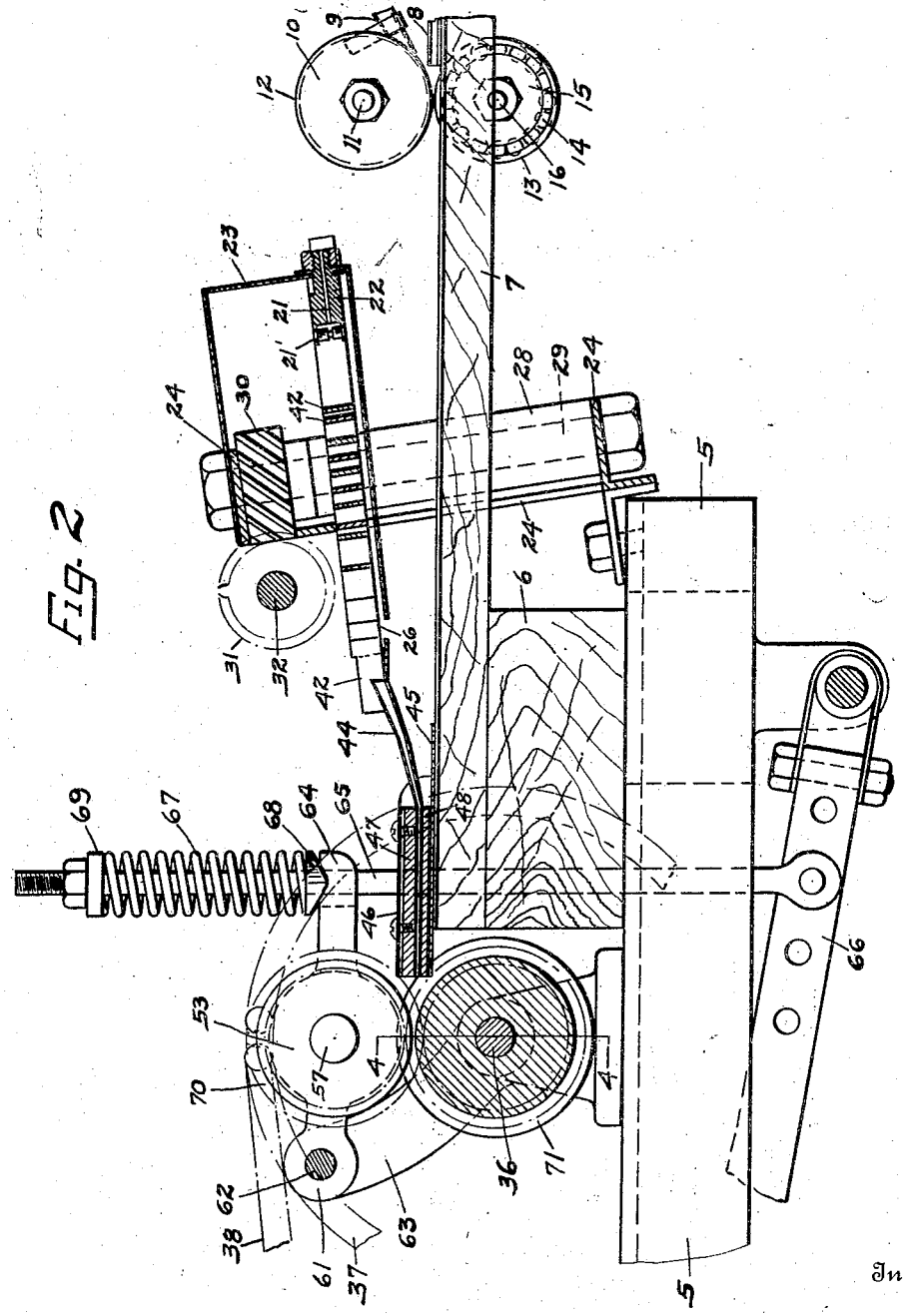

1,511,507

UNITED STATES PATENT OFFICE.

EDGAR R. CREAMER, OF CONNERSVILLE, INDIANA, ASSIGNOR TO THE GEORGE R. CARTER COMPANY, OF CONNERSVILLE, INDIANA, A CORPORATION OF INDIANA.

MACHINE FOR MAKING MOLDING FOR UPHOLSTERING.

Application filed December 31, 1923. Serial No. 683,558.

*To all whom it may concern:*

Be it known that I, EDGAR R. CREAMER, a citizen of the United States, residing at Connersville, in the county of Fayette and State of Indiana, have invented certain new and useful Improvements in Machines for Making Molding for Upholstering, of which the following is a specification.

This invention relates to a method and apparatus for the manufacture of molding for upholstering, the object of the invention being to provide a method and apparatus of this character by which the molding may be made in a simple and economical manner.

In the drawings:

Fig. 1 is a top plan view of the apparatus.

Fig. 2 is a section on the line 2—2 of Fig. 1.

Fig. 3 is an enlarged top plan view of a portion of the apparatus.

Fig. 4 is a section on the line 4—4 of Fig. 2.

Fig. 5 is a section on the line 5—5 of Fig. 3.

Fig. 6 is a section on the line 6—6 of Fig. 3.

Fig. 7 is a detail partly in section of one of the fingers of the wire forming devices.

Fig. 8 is a plan view of a portion of the molding formed by the apparatus.

Fig. 9 is a section on the line 9—9 of Fig. 8.

The molding which the apparatus is designed to manufacture is shown in Figs. 8 and 9 and is a molding used in trimming upholstering, particularly the upholstering of automobiles. The molding consists of a strip 1 of leather or other suitable material, a comparatively small bead 2 round in cross section, a second bead 3 flat on one side and rounded on the other side, and a wire 4 bent in zig-zag form. The beads and wire are laid upon the strip 1 in parallel relation therewith and the side edges of said strip folded over the beads and wire, the inner surface of the outer strip being gummed so as to cause it to adhere to the beads and wire. The finished molding is in the form shown at the right in Fig. 8. In applying the molding to the upholstering the molding is tacked to position and folded over the tacks in the manner shown in Fig. 9, the purpose of the wire being to hold the molding in its folded position.

The apparatus for manufacturing this molding consists in means for feeding a strip of leather or other material, means for feeding a pair of beads in proper relation with said strip and means for bending the wire in zig-zag form and placing it in proper relation with the said strip and beads, means for folding the outer edges of said strip over the beads and wire, and means for applying pressure to the parts to cause them to adhere together, which pressure applying means also acts to feed the various parts through the machine, and means for scoring the molding so that it may be readily folded to the position shown in Fig. 9 after the same has been tacked to the upholstering.

Referring to the drawings, 5 represents a base upon which the working parts are supported, the forward end of this base having secured thereto a supporting block 6 and a forwardly extending supporting strip 7. The forward end of the support 7 has a flat channel-shaped inclined guide 8 into which the flat strip of material 1 is fed and immediately above the rear end of this guide 8 is another channel-shaped guide 9 into which the bead 3 is fed. The guide 9 is supported from a pair of disks 10 which are secured upon a cross rod 11 between which is loosely journaled a roll 12 which cooperates with another roll 13 mounted upon ball bearings 14 upon a ball race 15 which is secured to a cross rod 16 supported by the supporting strip 7. The supporting rod 11 is pivoted as at 17 (Fig. 1) and the end thereof fits into the upper end of an open guide 18 and has attached thereto one end of a coil spring 19, the opposite end of which is secured to the rod 16, so that a yielding pressure is applied to the roll 12. As before stated the inner surface of the strip 1 is gummed and the head 3 as it is fed between these rolls 12 and 13 is pressed on the strip to cause it to adhere thereto.

The small bead 2 is fed into a tube 20 (Fig. 1) and by this tube is guided to a device which acts to properly position the same on the strip 1 and to turn over the side edges of the strip 1 in the manner to be explained.

The wire 4 is fed into a channel 21 formed in a small head 22 which is secured to a small U-shaped bracket 23 which in turn is secured to and supported by a large rectangular-shaped bracket 24 which is securely bolted to the forward end of the base 5. This large bracket 24 supports a pair of disks 26 and 27 each of the disks having an extended hub or sleeve 28 which is loosely mounted upon a shaft 29 which is rigidly secured to the bracket 24. Each of the disks also has secured thereto a spiral gear 30 which meshes with a spiral gear 31 secured to a cross shaft 32 mounted in bearings 33 supported on the bracket 24. The end of the shaft 32 has a sprocket wheel 33' driven by a chain 34 from the sprocket pinion 35 on the end of a cross shaft 36 supported in suitable bearings on the base 5 and having on its opposite end a sprocket wheel 37 driven by a chain 38 from a sprocket pinion 39 which is connected to a pulley 40 mounted on the end of a shaft 41, power being applied to the pulley from any suitable source to cause the disks to rotate in the direction of the arrows shown in Fig. 1. Each of the disks has on its entire periphery a plurality of equally-spaced radial fingers 42, but a few of the fingers being shown. The end of each finger is provided with a grooved anti-friction roll, shown in detail in Fig. 7. The fingers of the respective rolls intermesh as shown in Fig. 3 and the wire 4 is fed thereto and caused to be engaged by the antifriction rolls 43 which serve to bend the wire in zig-zag fashion as clearly shown in Fig. 3. The rear end of the head 22 also has a pair of vertically-arranged anti-friction rolls 21'. These wire binding disks are slightly inclined downwardly from front to rear and arranged closely adjacent the rear sides thereof is a downwardly inclined guide chute 44 into which the bent wire is fed, this chute leading to the turn-over device heretofore referred to and which will now be described.

A base plate 45 is secured to the inner end of the supporting strip 7 and has formed on the upper side thereof a channel 46 of tapering form. The chute 44 which receives the wire extends into this channel 46 and has secured to the upper side thereof a centrally-arranged tapered spacing block 47, (Figs. 3 and 5) screws 48 entering this block from the outside of the channel serving to secure the chute 44 and block in position. A guide block 48 is secured to the lower side of the chute 44 in a manner so as to leave at one side thereof a space substantially the width of the bead 3, while the opposite side of the block 48 has secured thereto the tube 20 for the small bead 2. The taper of the block 47 is substantially the same as the taper of the walls of the channel 46 so that the space on the upper side of the chute 44 will be of substantially the same width throughout the length of the channel.

At the rear end of the channel 46 are located feed and presser rolls. A lower roll 49 is splined to the shaft 36 and has a grooved periphery, the bottom of the groove being provided with channels 50 and 51 located on the respective sides thereof with an intermediate knurled or roughened portion 52. Cooperating with this roll 49 is a pair of rolls 53 and 54. The roll 53 has a plain periphery and cooperates with that portion of the roll 49 having the large channel 50, while the roll 54 is provided with a groove 55 cooperating with the groove 51 and a knurled or roughened portion 56 cooperating with the knurled or roughened portion 52. These rolls 53 and 54 are independently mounted and driven and held in yielding relation with the roll 49. Each of the rolls is mounted on one end of a shaft 57 and each shaft is journaled in a bearing 60 which has a pair of ears 61 loosely mounted upon a cross rod 62 supported by arms 63 projecting upwardly from the base 5. The forward side of each bearing has a finger 64 formed with a bifurcated end to receive a rod 65 which is pivoted at its lower end to a rigid support 66 and has on its outer end a coil spring 67 interposed between a washer 68 and an adjusting nut 69 with the washer bearing on the finger 64 so as to hold the upper rolls in yielding engagement with the lower roll 49 but permitting them to yield independently. The outer end of each of the shafts 57 has secured thereto a gear 70 which meshes with a gear 71 on the shaft 36 whereby the rolls are independently driven at the same speeds.

It will be noticed that as the product passes between the rolls 52 and 54 the small bead 2 rides in the channel 51 with which cooperates the groove or channel 55 of the roll 54, while the large bead 3 rides in the channel 50 with which cooperates the plain surface of the other roll 53 which results in the outer covering being pressed firmly to these beads regardless of any variation in the thickness of the material because of the fact that the rolls are independently mounted. The knurled or roughened surface 56 cooperating with the knurled or roughened surface 52 acts to press the material of the covering firmly into the spaces between the turns of the wire and also gives the necessary adhesion between the molding and the rolls to effect proper feeding.

The finished product passes between a grooved roll 72 and another roll 73 having a pointed periphery by which the molding is scored at a point between the spaced apart edges of the covering 1 whereby it may be readily folded to the position in Fig. 9. The roll 73 is carried in a frame 73' pivoted on the rod 73'' and a spring 73ª serves to yieldingly hold the roll 73 against the roll 72. These scoring rolls also act to feed the material and rotate at substantially the same speed as the feed and presser rolls 49 and 53.

The operation is as follows: A strip of material to form the outer cover 1 is inserted through the guide 8 and into the large forward end of the channel 46 beneath the wire conduit 44 and guide block 48, with its side edges bent to rest against the sides of the channel. The bead 3 is inserted into the guide channel 9 and between the rolls 10 and 13 and thence into the space in the channel 46 beneath the wire conduit 44 and block 48. The small bead 2 is inserted through the guide tube 20 which continues through the channel 47. The wire is inserted into the channel 22 and between the fingers of the disks as explained and after being bent in zig-zag fashion is inserted into the guide tube 44. The peculiar tapered formation of the channel 46 with its sides rounded as shown causes the sides of the covering 1 to be folded over the beads and wire as clearly shown in Fig. 5. The spacing block 47 serves to prevent the side edges of the covering from overlapping and leaves a uniform space between the edges. All the parts are then placed between the rolls 49 and 54 and 53 in the manner clearly shown in Fig. 4 which serves not only to feed the parts, but also to press the outer casing firmly about the beads and wire and cause it to adhere thereto. The roughened surface of the rolls serves to embed the wire in the covering between the beads. From the feed and presser rolls the finished product passes to the scoring rolls by which it is scored at a point between the side edges of the covering, and from thence passes through a channel 74 which has at its rear end a pivoted cutting knife 75 the free end of which is suspended through the medium of a coil spring 76 from a support 77 with suitable means (not shown) for operating the cutter so as to cut off the finished product in any desired length.

Having thus described my invention, I claim:

1. The method of forming molding for upholstering consisting in feeding a strip of material to form a covering, feeding a pair of beads and a flexible retaining device in parallel relation with said covering, folding the outer edges of the covering over the beads and retaining device, and applying pressure to the parts.

2. The method of forming molding for upholstering, consisting in feeding a strip of material to form a covering, feeding a pair of beads and a flexible retaining device in parallel relation with said covering, folding the outer edges of the covering over the beads and retaining device, leaving space between the edges of said covering, applying pressure to the parts, and scoring the retaining device between the edges of the covering.

3. The method of forming molding for upholstering, consisting in feeding a strip of material to form a covering, feeding a pair of beads in parallel relation with said covering, bending a wire in zig-zag fashion and feeding the same in parallel relation with said covering and beads, folding the outer edges of the covering over the beads and wire, and applying pressure to the parts.

4. In an apparatus of the character described, means for feeding an outer cover and a pair of beads to a common point in parallel relation with each other, means for feeding a flexible retaining device in parallel relation with said covering and beads, means for folding the side edges of the covering over said beads and retaining device, and means for applying pressure to said parts.

5. In an apparatus of the character described, means for feeding an outer covering and a pair of beads to a common point in parallel relation with each other, means for bending a wire in zig-zag fashion and feeding the same in parallel relation with said cover and beads, means for applying pressure to the parts.

6. In an apparatus of the character described, means for feeding an outer covering and beads to a common point, means for bending a wire in zig-zag fashion and feeding the same to said covering and beads in parallel relation therewith, means for folding the side edges of the cover over said wire and beads, means for uniformly spacing the side edges of said cover, and means for scoring the wire between the side edges of said cover.

7. In an apparatus of the character described, means for feeding an outer covering and beads to a common point, means for forming and feeding a flexible retaining device to said beads and cover, means for folding the outer edges of the cover over the beads and retaining device, a plurality of feeding and pressure applying rolls to apply pressure to the molding after the assembling and folding operation, and a pair of scoring and feed rolls for scoring the wire and assisting in the feeding operation.

8. In an apparatus of the character described, means for feeding a cover, means for feeding a pair of beads in parallel relation with said cover and placing the same thereon, means for feeding a flexible retaining device to said cover and beads and placing the same thereon, means for folding the side edges of the cover over said beads and retaining device, and a plurality of feeding and presser rolls, two of said rolls being independently mounted and driven and held in spring-pressed relation with the other roll.

9. In an apparatus of the character described, means for assembling a cover, a pair of beads and a flexible retaining device in parallel relation with each other and folding the side edges of the cover over the beads and retaining device, presser rolls for pressing the assembled parts to form molding, one roll being arranged on one side of said molding and the two other rolls on the opposite side of the molding, said first-mentioned roll having a pair of grooves to receive the beads and a roughened surface between said beads, the other two of said rolls being independently mounted and driven and held in spring pressed relation with said first roll, one of said independently mounted rolls having a groove and a roughened surface to cooperate with one of the grooves and roughened surface of the first mentioned rolls, and the other of said independently mounted rolls having a plain surface.

10. In an apparatus of the character described, a channel member of tapering form, a wire feeding chute projecting into said channel member and spaced therefrom, a bead feeding tube also projecting into said channel member at one side of said chute, a guide block on the lower side of said chute and mainly on one side of the center thereof, means for feeding a flexible covering to said channel member beneath said chute, means for feeding a second bead beneath said tube and at the side of said guide block, means for feeding a wire fashioned in zigzag form to said chute, said channel member having rounded sides to cause the covering to be folded over the beads and wire, and a spacer in said channel member above said tube to hold the edges of said covering in uniform spaced relation.

11. In an apparatus of the character described, the combination, with means for feeding and assembling a cover, beads and wire retainer, of a device for forming the wire in zig-zag fashion consisting of a pair of rotatable members, each provided with a series of fingers on its periphery with the fingers of the respective members intermeshing, together with means for driving the said members at the same speed, and means for feeding wire to said fingers to cause the wire to be engaged by said fingers and bent in zig-zag fashion.

12. In an apparatus of the character described, the combination, with means for feeding and assembling a cover, beads and wire retainer, of a device for forming the wire in zig-zag fashion consisting of a pair of rotatable members each provided with a series of fingers on its periphery with the fingers of the respective members intermeshing together with means for driving said members at the same speed, an anti-friction roll upon the end of each finger, and means for feeding wire to said fingers to cause the wire to be engaged by said anti-friction rolls and bent in zig-zag fashion.

In testimony whereof, I have hereunto set my hand this 28th day of December, 1923.

EDGAR R. CREAMER.